US010141121B2

(12) United States Patent
Lie

(10) Patent No.: US 10,141,121 B2
(45) Date of Patent: *Nov. 27, 2018

(54) SUPER ELECTRICAL BATTERY

(71) Applicant: Woo Yong Lie, Los Angeles, CA (US)

(72) Inventor: Woo Yong Lie, Los Angeles, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/291,019

(22) Filed: Oct. 11, 2016

(65) Prior Publication Data
US 2017/0032899 A1  Feb. 2, 2017

Related U.S. Application Data

(63) Continuation-in-part of application No. 13/891,018, filed on May 9, 2013, now Pat. No. 9,905,374.

(51) Int. Cl.
H01G 11/26 (2013.01)
H01G 11/36 (2013.01)
H01M 10/36 (2010.01)
H01G 11/28 (2013.01)
H01G 11/70 (2013.01)

(52) U.S. Cl.
CPC ............ H01G 11/26 (2013.01); H01G 11/28 (2013.01); H01G 11/36 (2013.01); H01G 11/70 (2013.01); H01M 10/36 (2013.01); Y02E 60/13 (2013.01)

(58) Field of Classification Search
CPC ........ H01G 11/26; H01G 11/28; H01G 11/36; H01G 11/70; H01M 10/36
See application file for complete search history.

(56) References Cited

U.S. PATENT DOCUMENTS 5,849,025 A * 12/1998 Owens ................... H01G 9/042
607/5
2006/0263687 A1* 11/2006 Leitner ................. H01G 9/038
429/217

OTHER PUBLICATIONS

Electronics Tutorials, Capacitors, Obtained Nov. 23, 2015, http://www.electronics-tutorials.ws/capacitor/cap_1.html (Year: 2015).*

* cited by examiner

Primary Examiner — Jimmy Vo
(74) Attorney, Agent, or Firm — John K. Park; Park Law Firm

(57) ABSTRACT

An electric energy storage device is provided, which includes first and second conductor layers, and positive and negative electrodes. Each of the first and second conductor layers has both surfaces coated with ionic or dipole material. A bilayer is comprised of the first conductor layer and the second conductor layer and ionic material layer sandwiched between them. A multilayer structure is comprised of millions of bilayers which are stacked together one by one. The positive electrode is attached to the first conductor layer and the negative electrode is attached to the last conductor layer. The first conductor layer is stacked on top of the second conductor layer with a nanometer-scale interval and with the ionic material layer inbetween, forming a bilayer structure and a quantum heterostructure. The first and second conductor layers form a bilayer configured to store electrical energy in the bilayer in a form of binding energy.

19 Claims, 11 Drawing Sheets excitonic bipolaron

SUPER ELECTRICAL BATTERY

RELATED APPLICATION

This application is a continuation-in-part of U.S. patent application Ser. No. 13/891,018 for "ELECTRIC ENERGY STORAGE DEVICE" filed on May 9, 2013.

BACKGROUND OF THE INVENTION

It is desirable to develop ways of storing the electrical energy generated by various sources so that it can be used when it is needed.

The present invention relates to an electric energy storage device. More particularly, this invention relates to an electric energy storage device, which has ultra high capacity. This invention disclosed a novel physical mechanism entirely different from the mechanism of conventional battery and capacitor. This has come up with an innovative approach that has garnered significant interest In order to compete with cheaper fossil-fuel power systems, the battery should be cheap to build with abundant materials on earth, and store enormous amounts of energy per weight.

An improved method for storage of electrical energy is one of the main challenges for inventors. A revolutionary improved method for electrical energy storage is presented.

The novel electric energy storage device develops a capacitance by a mechanism entirely different from the mechanism of other ionic battery or other electrochemical battery or other kind of super capacitor using activated carbon and electrolytes.

The present invention provides a revolutionary novel electric energy storage cell whose electrical energy capacity is approximately more than 10 MWh/Kg. This breakthrough shows promise to resolve current energy crisis and global worming problems.

The recent development of advanced electronics society requires electric energy storage devices which has an ultra high capacity. Conventional energy storage devices are limited by many kinds of problems, and one of them is the energy storing capacity and high manufacturing cost.

Accordingly, a need for an electric energy storage device has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide an electric energy storage device of ultra high capacity by introducing a revolutionary novel method.

An electric energy storage device comprises a first conductor layer, a second conductor layer, a positive electrode, and a negative electrode.

The first conductor layer has both surfaces coated with ionic or dipole material across entire surface thereof.

The second conductor layer has both surfaces coated with ionic or dipole material across entire surface thereof.

A bilayer is comprised of the first conductor layer and the second conductor layer and ionic material layer sandwiched between them.

A multilayer structure is comprised of millions of bilayers which are stacked together one by one.

The positive electrode is attached to the first conductor layer of the multilayer structure.

The negative electrode is attached to the last conductor layer of the multilayer structure.

The first conductor layer is stacked on top of the second conductor layer with a nanometer-scale interval therebetween and with the ionic material layer sandwiched between them so as to form a bilayer structure and at the same time a quantum heterostructure.

The first and second conductor layers form a bilayer configured to store electrical energy in the bilayer in a form of binding energy, wherein the electrical energy is stored in the multilayer by applying a DC voltage to the positive and negative electrodes.

Each of the first and second conductor layers may include activated carbons, electrically polarizable ionic materials, graphenes, carbon nanotubes, or any kind of conducting materials that are nanometer-scale and suitable to get coated with an ionic material for a conductor layer, ionic polymers, and ionic minerals.

The ionic materials coated on conductor layers may have a substantially zero electric charge transport property so as to be an insulator.

The first and second conductor layers may be stacked on top of each other so as to form a 2+1 dimension for a dipole-dipole interaction which is considered separately in vertical and horizontal direction to the 2 dimensional plane.

A nanometer-sized bound state of charge polarization may be induced and created by a charge separation and an excitation of valence electron, which is an electric quantum dipole.

Each of the first and second conductor layers may be two-dimensional with a nanometer-scale thickness. The periodicity length of the layers in the vertical direction to the layers requires a nanometer scale for quantum dipole interaction and polaron interaction.

The electrical energy supplied by an external DC field may be stored in an antiferroelectric nanostructure in the bilayer.

The stored electrical energy is discharged and output to the first and second electrodes by using an external AC field in a predetermined frequency range as a trigger power and guiding field.

The frequency of the external AC field may be tuned with the dipole moments of the electrical energy storage device in discharge.

The antiferroelectric nanostructure may function as a micro-voltaic power source in discharge.

Each of the first and second conductor layers may be made from one selected from the group consisting of open structured activated carbon powder, carbon nano tube, and graphene.

Each of the first and second conductor layers may be made from high surface area activated carbon powder.

The ionic materials may be selected from the group consisting of $MgSO_4$, $LiPF_6$, $LiClO_4$, $LiN(CF_3SO_2)_2$, $LiBF_4$, $LiCF_3SO_3$, $LiSbF_6$, $Li_4Ti_5O_{12}$. In a specific embodiment, the ionic material may be $MgSO_4$.

Each of the first and second conductor layers may be grown by a molecular beam epitaxy or metal-organic chemical vapor deposition.

The advantages of the present invention are: (1) the device has an ultra high capacity; and (2) the device can be manufactured by much lower cost than conventional battery.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 13:
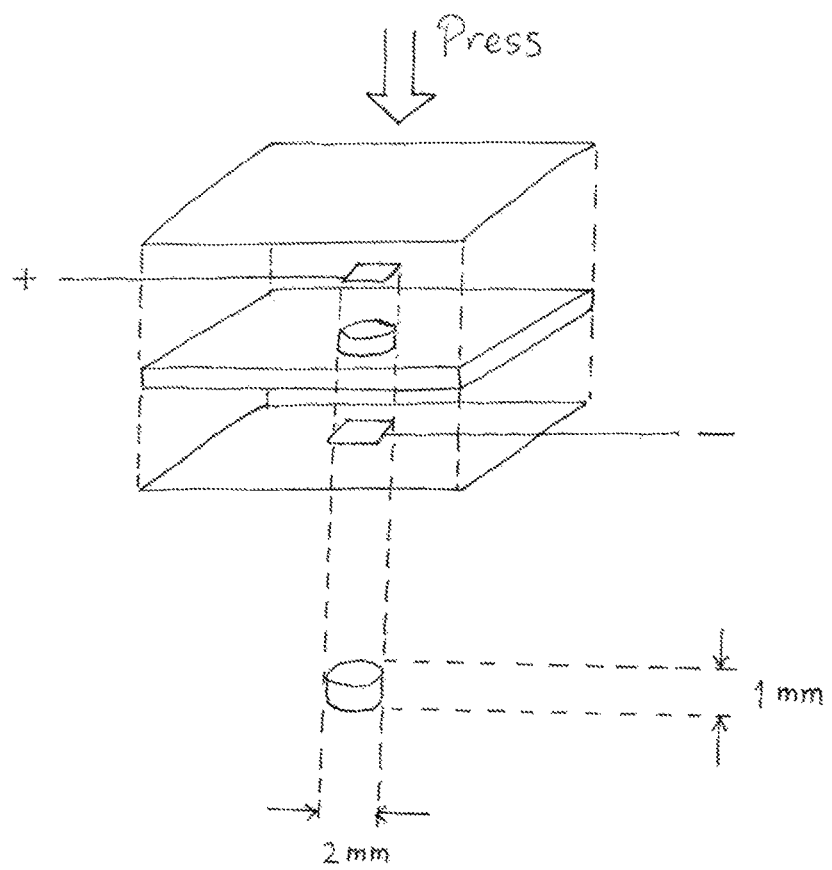
FIG. 13 is a schematic diagram showing how to obtain a multilayer structure according to an embodiment of the invention.
Figure 14:
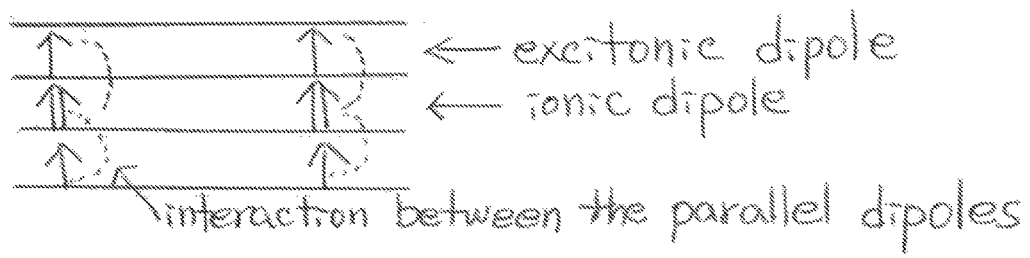
FIG. 14 is a schematic diagram showing a dipole-dipole interaction between excitonic and ionic dipoles according to an embodiment of the invention.
Figure 15:
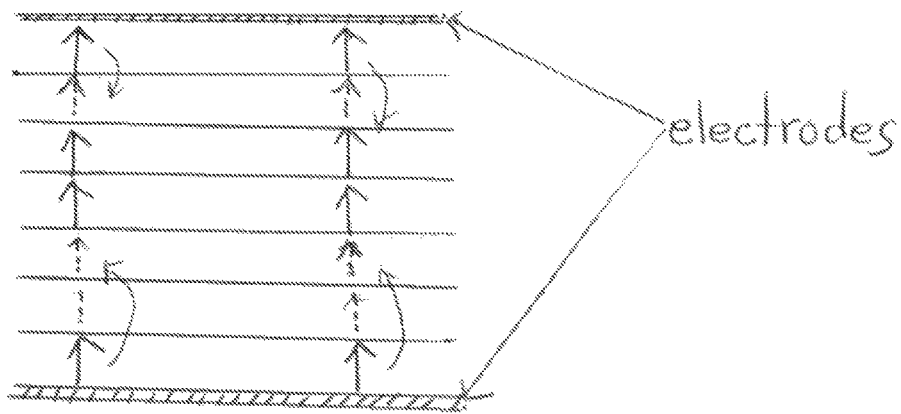
FIG. 15 is a schematic diagram showing a dipole field propagation to empty states according to an embodiment of the invention.
Figure 16:
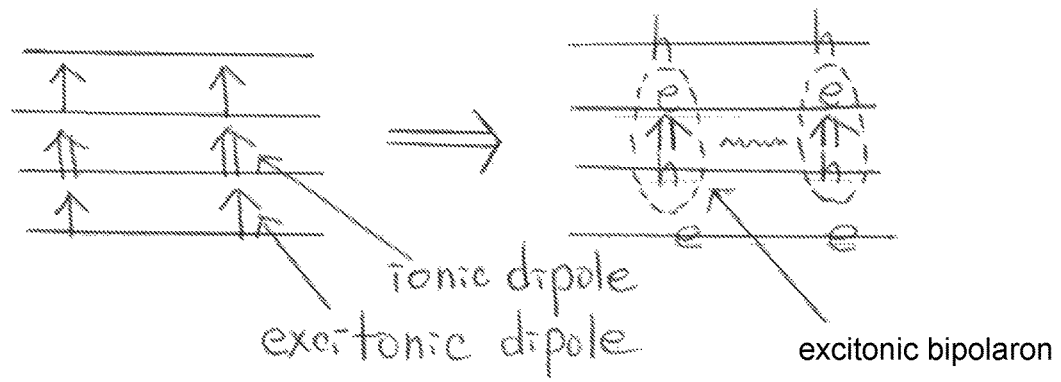
FIG. 16 is a schematic diagram showing a transformation to excitonic bipolaron according to an embodiment of the invention.
Figure 17:
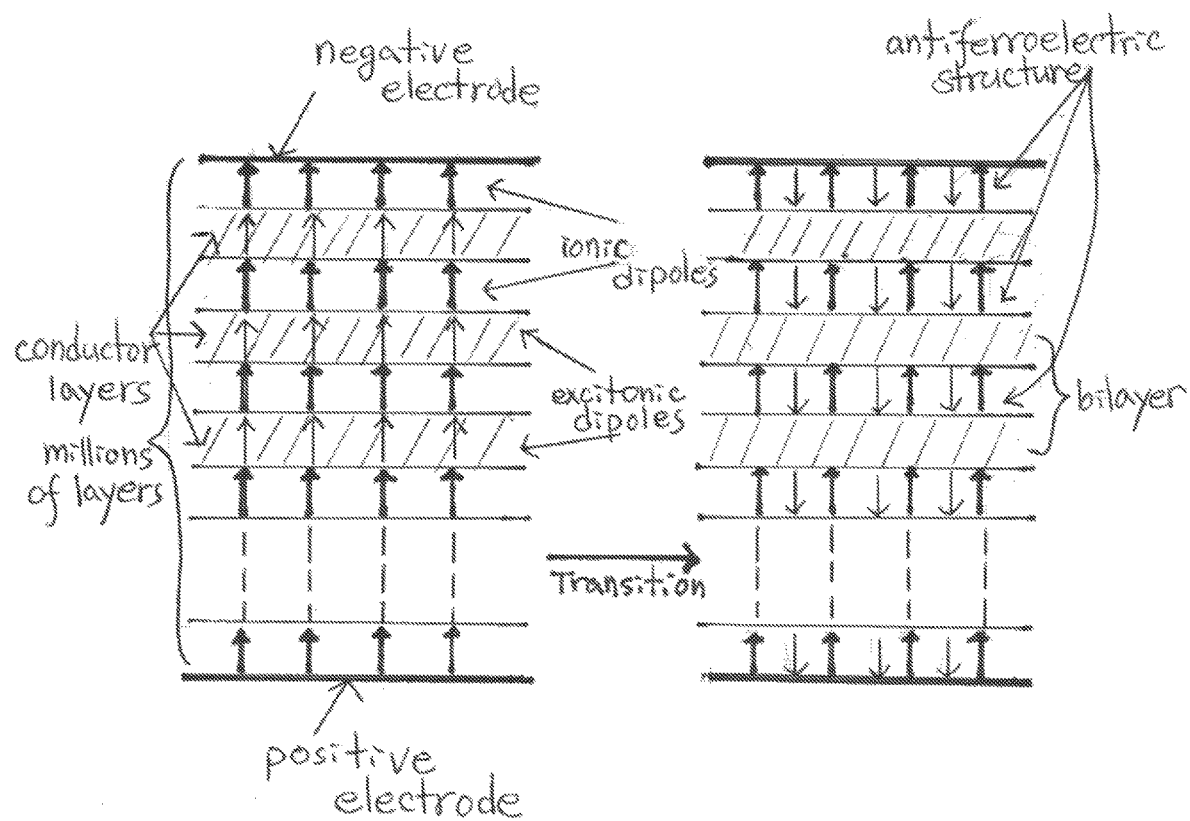
FIG. 17 is a schematic diagram showing an antiferroelectric transition according to an embodiment of the invention.
Figure 18:
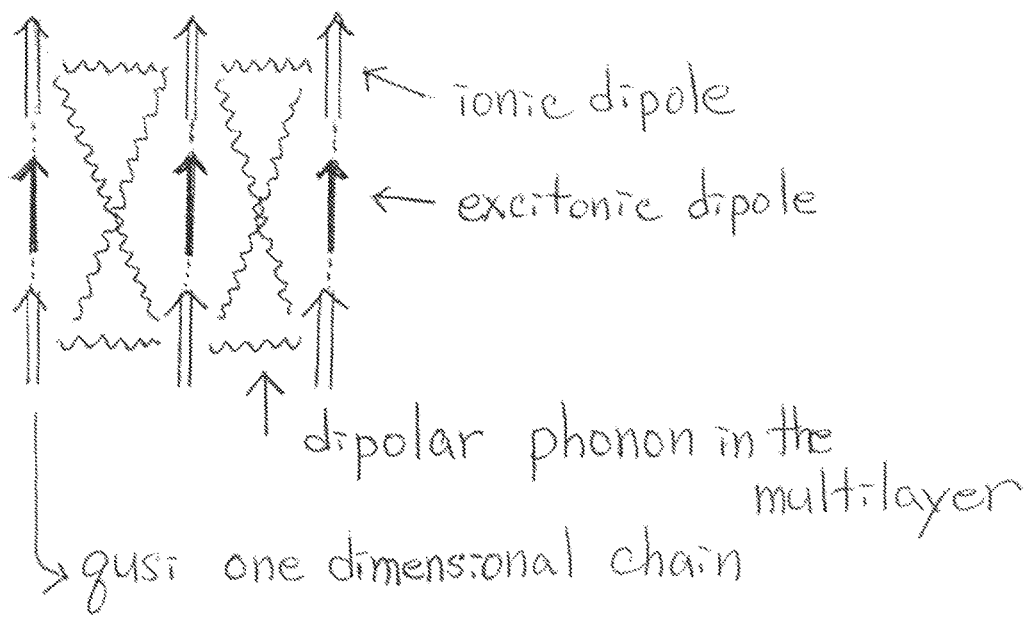
FIG. 18 is a schematic diagram showing a linear chain of dipoles according to an embodiment of the invention.
Figure 19:
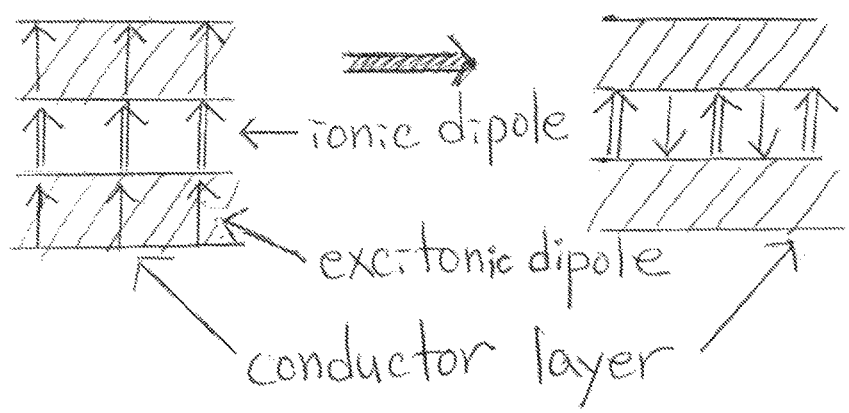
FIG. 19 is a schematic diagram showing a bilayer structure according to an embodiment of the invention.

FIGS. 1-6 show multilayer structures for an electric energy storage device according to the invention. FIGS. 7 and 8 are schematic circuit diagrams for charging and discharging of the electric energy storage device. FIGS. 9-12 show operations of the electric energy storage device. FIG. 13 shows how to obtain a multilayer structure. FIG. 14 shows a dipole-dipole interaction between excitonic and ionic dipoles. FIG. 15 shows a dipole field propagation to empty states. FIG. 16 shows a transformation to excitonic bipolaron. FIG. 17 shows an antiferroelectric transition according to an embodiment of the invention. FIG. 18 shows a linear chain of dipoles. FIG. 19 shows a bilayer structure.

An electric energy storage device 100 comprises a first conductor layer 10, a second conductor layer 20, a positive electrode 30, and a negative electrode 40.

The first conductor layer 10 has both surfaces coated with ionic or dipole material 12 across entire surface thereof.

The second conductor layer 20 has both surfaces coated with ionic or dipole material 12 across entire surface thereof.

The positive electrode 30 is attached to the first conductor layer 10.

The negative electrode 40 is attached to the second conductor 20.

Figure 1:
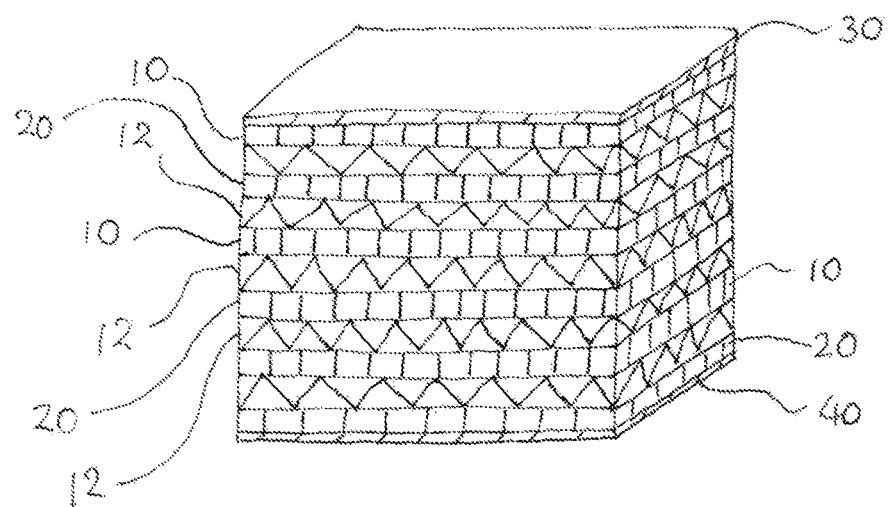
FIG. 1 is a perspective view of 2+1 dimensional battery cell multilayer structure according to an embodiment of the invention.
Figure 2:
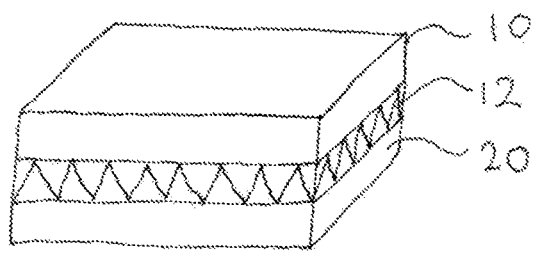
FIG. 2 is a perspective view showing a conductor bilayer according to an embodiment of the invention.
Figure 3:
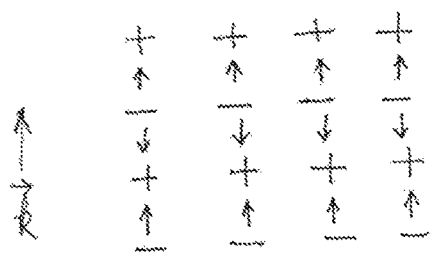
FIG. 3 is a schematic diagram showing a static longitudinal dipolar wave according to an embodiment of the invention.

The first conductor layer 10 is stacked on top of the second conductor layer 20 with a nanometer-scale interval therebetween so as to form a multilayer structure and at the same time a quantum well heterostructure as shown in FIG. 1.

The first and second conductor layers 10, 20 form a bilayer configured to store electrical energy in the bilayer in a form of binding energy, and the electrical energy is stored in the first and second conductor layers 10, 20 by applying a DC voltage 92 to the positive and negative electrodes 30, 40 as shown in FIGS. 7 and 8.

The stored electrical energy is discharged and output to the first and second electrodes 30, 40 by using an external AC voltage 90 in a predetermined frequency range as a trigger power as shown in FIG. 8. The output from the external AC voltage 90 may be going through a transformer 94 as shown in FIG. 8.

Each of the first and second conductor layers 10, 20 may include activated carbons, electrically polarizable ionic materials, graphenes, carbon nanotubes, or any kind of conducting materials that are nanometer-scale and suitable to get doped with an ionic material for a conductor layer, ionic polymers, and ionic minerals.

Each of the first and second conductor layers 10, 20 may be two-dimensional with a nanometer-scale thickness.

The first and second conductor layers 10, 20 may be stacked on top of each other so as to form a 2+1 dimension.

The ionic or dipole material 12 coated on the first and second conductor layers 10, 20 may have a substantially zero electric charge transport property in a direction perpendicular to a plane of the first or last conductor layer 10, 20 so as to be an insulator in that direction.

A nanometer-sized bound state of charge polarization may be induced and created by a charge separation and a longitudinal optical mode of dipolar phonon between the first and second conductor layers 10, 20 as shown in FIGS. 3-6.

Figure 4:
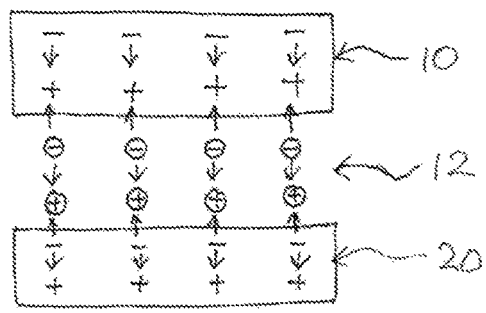
FIG. 4 is a schematic diagram showing a charge double layer according to an embodiment of the invention.
Figure 5:
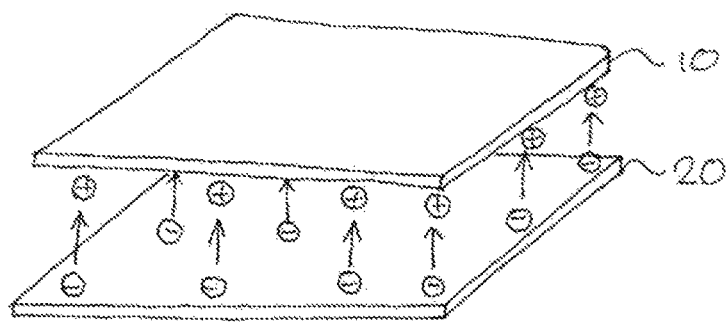
FIG. 5 is a schematic diagram showing a ferroelectric array of ionic dipoles according to an embodiment of the invention.
Figure 6:
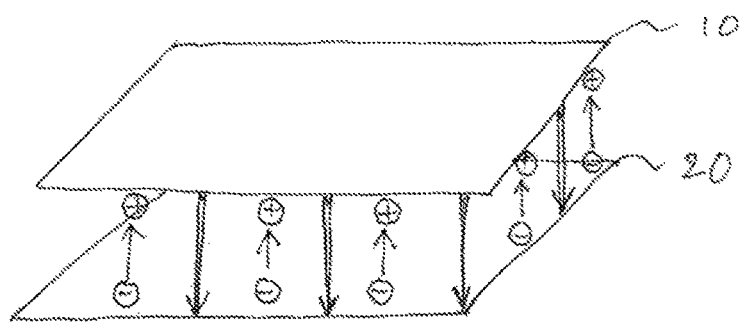
FIG. 6 is a schematic diagram showing an antiferroelectric array according to an embodiment of the invention.
Figure 7:
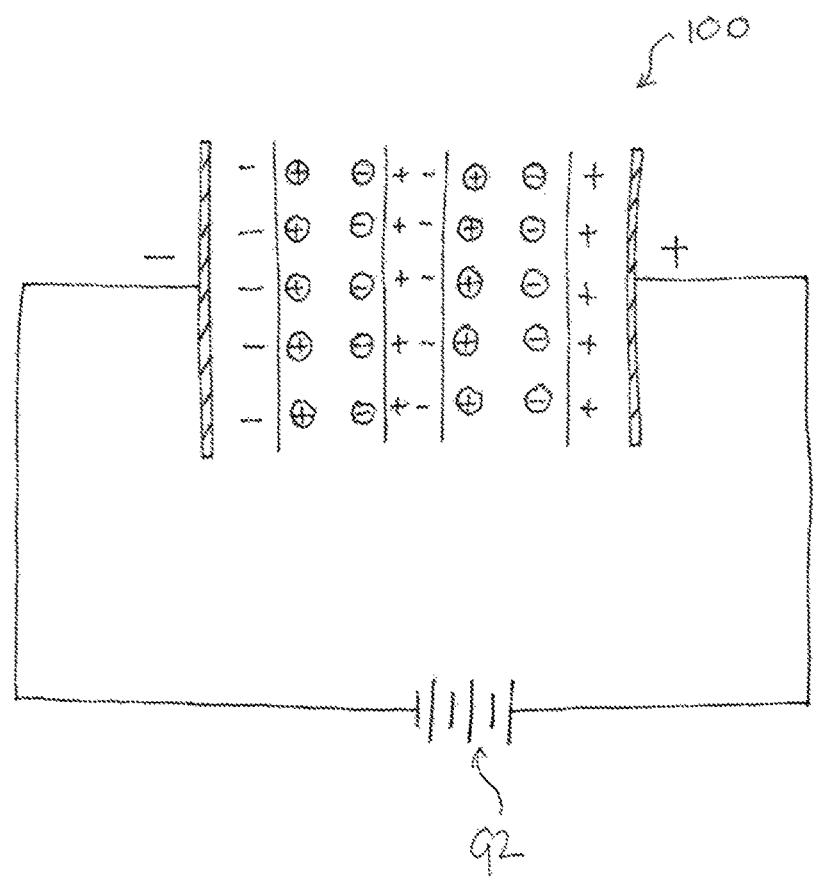
FIG. 7 is a schematic circuit diagram showing a charging process of an electric energy storage device according to an embodiment of the invention.
Figure 8:
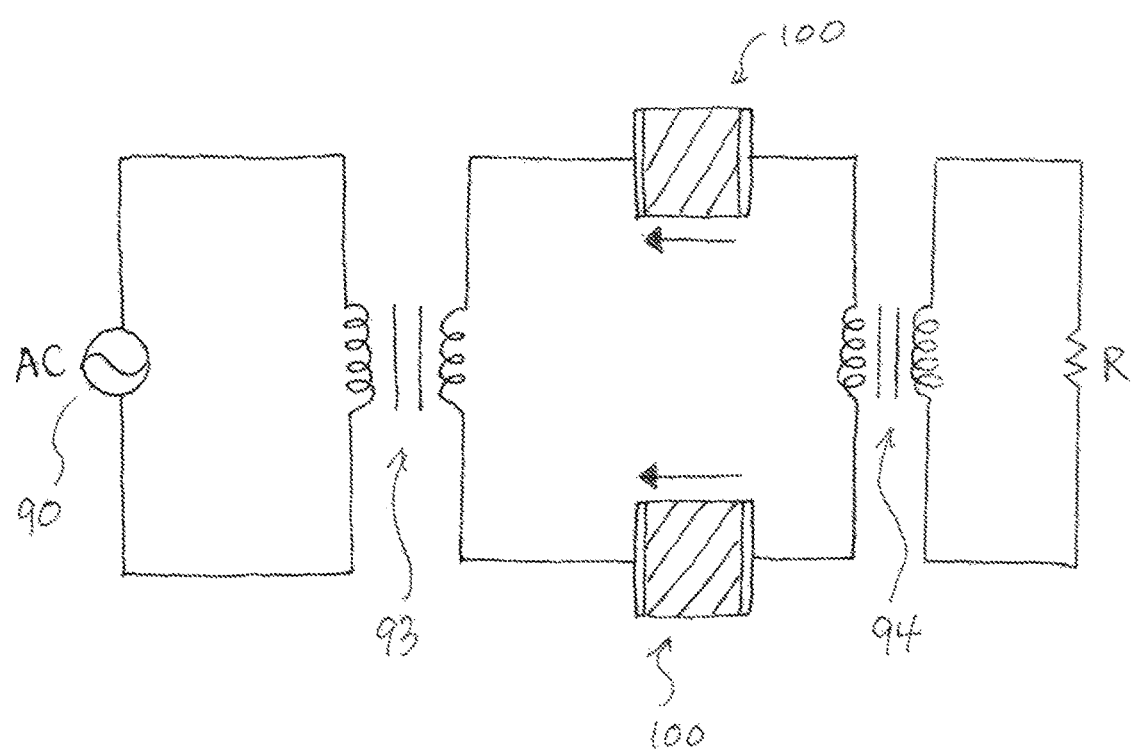
FIG. 8 is a schematic circuit diagram showing a discharging process of an electric energy storage device according to an embodiment of the invention.

The electrical energy may be stored in an antiferroelectric nanostructure in the bilayer 10, 20 and the electronic charge double layer inside the conductor layers 10, 20 as shown in FIGS. 4, 6, and 7.

The frequency of the external AC field may be tuned with the dipole moments of the electrical energy storage device 100.

The antiferroelectric nanostructure may function as a micro-voltaic power source in discharging.

Each of the first and second conductor layers 10, 20 may be made from one selected from the group consisting of open structured activated carbon powder, carbon nano tube, and graphene.

Each of the first and second conductor layers 10, 20 may be made from high surface area activated carbon powder.

The ionic or dipole material 12 may be selected from the group consisting of MgSO4, LiPF6, LiClO4, LiN(CF3SO2)2, LiBF4, LiCF3SO3, LiSbF6, Li4Ti5O12. In a specific embodiment, the ionic or dipole material 12 may be MgSO4.

Each of the first and second conductor 10, 20 may be grown by a molecular beam epitaxy or metal-organic chemical vapor deposition.

Figure 9:
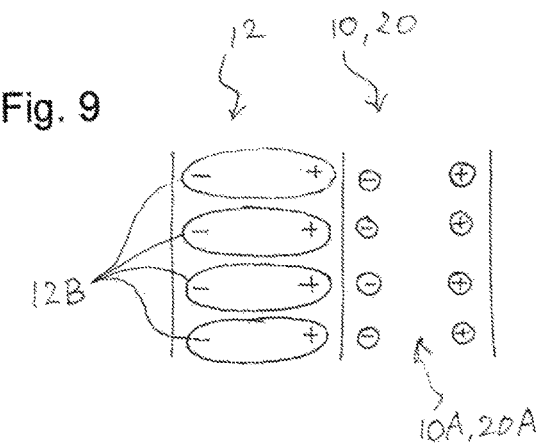
FIG. 9 is a schematic diagram showing an electric charge double layer according to an embodiment of the invention.

FIG. 9 shows forms an electric charge double layer 10A, 20A formed by the first or last conductor layer 10, 20, and ionic dipoles 123 formed by longitudinal optical mode.

Figure 10:
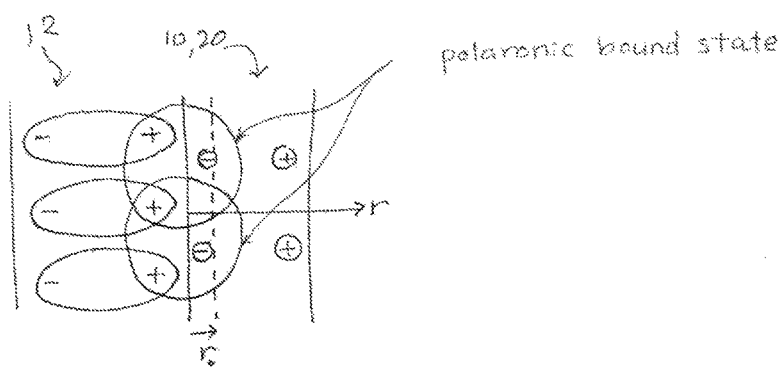
FIG. 10 is schematic diagram showing a coordinate system for the electric charge double layer of FIG. 9.
Figure 11:
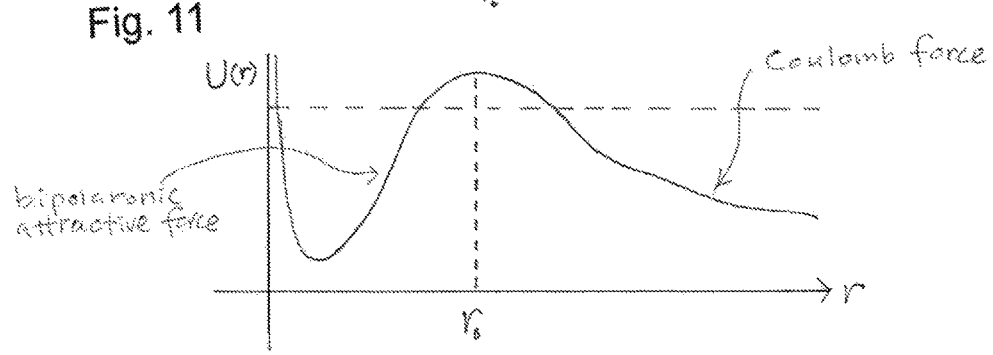
FIG. 11 is a graph of electric potential of the charge double layer according to an embodiment of the invention.

FIGS. 10 and 11 show an electric potential of the charge double layer, where r is a distance from the border between the conductor layer 10, 20 and the ionic or dipole material 12, and $r_o$ is a polaronic interaction range. In the range of $r < r_o$, the electric charges are bounded by polaronic interaction and Coulomb interaction, which cause a breaking of exciton into the electron and the hole.

Figure 12:
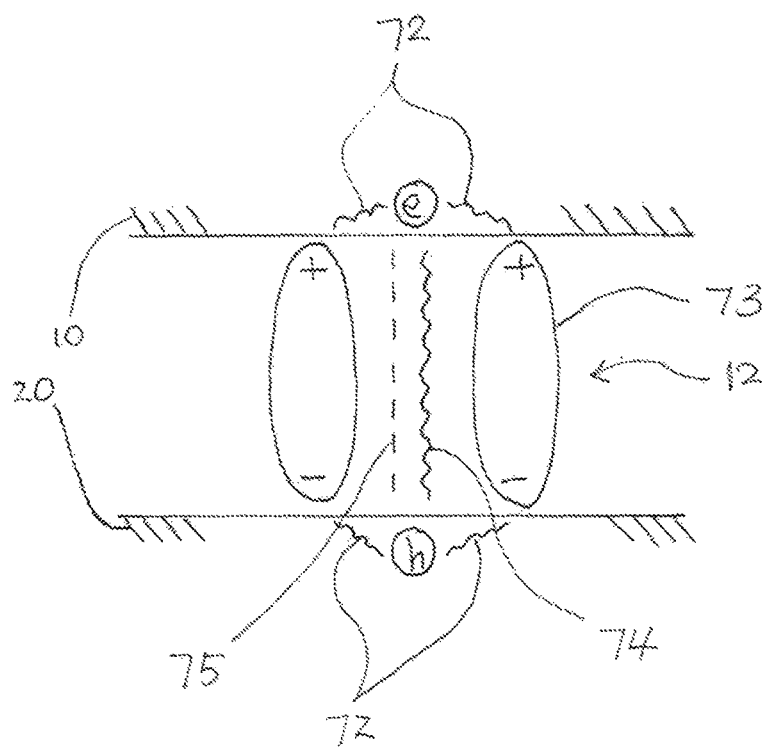
FIG. 12 is a schematic diagram showing an electron-hole bound state according to an embodiment of the invention.

FIG. 12 shows an electron-hole bound state among the first and second conductor layers in the bilayer 10, 20 and the ionic or dipole material 12. The electron, the hole, and the ions are interacting with one another through a polaronic bound state 72, electron-hole interaction 73 through polaronic optical mode, and a Coulomb interaction 75.

The present invention provides a revolutionary novel electric energy storage cell whose electrical energy capacity is approximately more than 10 MWh/Kg. This breakthrough shows promise to resolve current energy crisis and global worming problems.

The novel electric energy storage device develops a capacitance by a mechanism entirely different from the mechanism of other ionic battery or other electrochemical battery or other kind of super capacitor and other conventional battery.

The battery cell comprises a pair of electrodes and the multilayer. The conductor layers are coated with ionic materials or dipole materials with which cover the entire layer surface, so that any electric current is not allowed. The two dimensional thin conductor layers coated with ionic or dipole materials are piled up together to form a 2+1 dimensional structure which is a layer stacking. The interval between the conductor layers in the bilayer and the thickness of conductor layer should be a nanometer size to introduce a quantum hetero-structure which may be grown by molecular beam epitaxy and metal-organic chemical vapor deposition. Both techniques can control a layer thickness close to one atomic layer.

The multilayer structure is an insulator in the direction perpendicular to the layer surface. When DC voltage is applied perpendicular to the layer surface, the electrostatic potential between the positive electrode and the negative electrode can be in the form of dipolar expansion in the ionic insulator materials.

On the conductor layer attached to the electrode, the charge carriers are built up by the interaction with ionic polarizations. In turn, the ion polarizations induce electronic charge polarization accompanied inside nearby conductor layer. It is a charge double layer in the conductor layer. So the electric energy supplied by both the positive and the negative electrode is transferred and stored in the cell in the form of binding energy if the electric charge polarization is stabilized by a polaronic and Coulomb interaction.

An exciton in the conductor layer breaks into an electron and a hole when a polaron interaction dominates and, and becomes positive polaron and negative polaron.

The interaction of the longitudinal mode of ionic dipole vibration with the electric charge is attractive to form a polaron. The interaction between the positive polaron and the negative polaron in the bilayer turns into an interaction between the electron and the hole mediated by longitudinal optical mode of ionic dipole vibration.

In the bilayer structure, the electron in the first conductor layer attracts the hole in the last conductor layer by the Coulomb force in the bilayer because the polaronic interaction dominates the excitonic interaction The direct Coulomb interaction causes the electrons in first conductor layer and the holes in the last conductor layer are bounded to form the excitons in the bilayer, which are different from the excitons in the conductor layer. The excitons in the bilayer are stable because of a spatial separation of the electrons and the holes, therebetween ionic dipole barrier.

The indirect exciton has a dipole moment in the bilayer. The interaction between the excitons and nearby ionic dipoles in the bilayer is a dipole-dipole interaction in the horizontal direction to the layer plane. An interaction between the dipoles of the same direction is repulsive in the 2 dimensional plane, but an interaction between the dipoles of the opposite direction is attractive. It is very important for the dipoles to keep the distance between them to be stabilized. The density of dipole shall be low for stable dipole-dipole interaction.

The dynamics of the dipoles of excitons and ions creates an antiferroelectric nanostructure in the bilayer. The electric energy delivered to the system is stored in the nano-structure. The electric energy can be stored more than 10 MWH/Kg in this sample, so the battery capacity increased drastically compared to a conventional battery.

In a macroscopic view, the excitons and ionic dipoles are electrically neutral, so the system is macroscopically neutral and it can help a charging process.

For a discharging process, AC field in the frequency range between 10 Hz to microwave frequency is used as a trigger power and guiding field. In this case the battery cell acts as a capacitor in response to AC input power. The input power is set to be tuned with macroscopic dipole wave which is a constructive assembly of the dipole wave. Each microstructure is a micro-power source for discharge process.

The present invention used activated carbons and electrically polarizable ionic materials, and may use graphenes, carbon nanotubes, or any kind of conducting materials that are nano-sized and suitable to get coated with an ionic material for a conductor layer, ionic polymers and ionic minerals.

Introduction

The current energy crisis and environmental problem require revolutionary energy storage system. The development of electric vehicle and portable electronic devices demands for a rechargeable battery of very high capacity. To meet these demands, it is required to develop a novel rechargeable battery whose capacity is extremely high way beyond conventional battery.

Another remarkable benefit of this novel battery is that it can be manufactured by much lower cost for mass production because the materials used by battery production are not rare on earth.

A revolutionary novel mechanism for storing electric energy is introduced, which is completely different from a conventional one. The new mechanism for the revolutionary energy storage device is related how to utilize a dipole-dipole interaction, which is different from the mechanism used in conventional battery and capacitor. Rather than utilizing a Faradaic mechanism and electrostatic mechanism, this device employs a novel method of a dipole-dipole interaction between the electronic dipoles and ionic dipoles. A conventional rechargeable battery has an intrinsic limitation in its capacity. The function to store electric energy is usually based on electrochemical reaction and ion transport. It is necessary to find out totally different and revolutionary way in storing electric energy to boost a battery capacity.

With respect to a density of the system, a high capacity means a high electric energy density and a high electronic charge density. A nano-sized bound state of charges in the bilayer is introduced, and the millions of the bilayers are stacked one by one so that the multilayer structure is formed in the three dimension. The layer density of the multilayer structure is very high, so that the stored energy density in the multilayer is tremendously high.

The interaction among the comprising elements is strong in a nanostructure so that the electric energy density in the structure becomes very high. An electric structure to meet the above requirements may reduce to a nano-size.

The conductor layers are two dimensional planes of nano-sized thickness.

The coated conductor layers are stacked one by one to construct a 2+1 dimensional multilayer structure. The thickness of the layers and the interval between the adjacent layers are in the range of a nanometer size.

The thin conductor layers are coated with ionic materials which cover the entire surface to be an insulator.

The valence electrons in the conductor layer is excited and separated to form the excitons. The ions sandwiched between the conductor layers are polarized when a external voltage is applied, which is in contrast with an electrolytes for Li-ion battery, super-capacitor, which has an ion transport property of electrolytes.

An electronic charge separation in the conductor layer is described as an indirect exciton which has a dipole moment, likewise an ionic polarization as an ionic dipole moment. An exciton which is a bound state of en electron and a hole has a dipole moment.

A nano-sized bound state of a positive and a negative charges is created in the multilayer structure, which is induced by a charge separation and a polarization when an external field is applied to the battery cell. The quantum dipole system is consisted of dipoles of excitons and ions.

The liquid type ions are coated on the 2 dimensional carbon layer surfaces. The structure of the volume is 2+1 dimensional, and the layers of 2 dimensional surfaces piled up with one conductor layer and one ionic material layer in turn so that it becomes an insulator in the perpendicular direction to the surface.

A dipolar pseudo spin wave propagates in the multilayer structure in the direction vertical to the layers. This mechanism is utilized for the process of charging or discharging.

The battery cell is composed of a pair of electrodes and the bilayers sandwiched between them. The conductor layers are coated with ionic materials or dipole materials with which cover the entire layer surface. The two dimensional thin conductor layers coated with ionic or dipole materials are piled up together to construct a 2+1 dimensional structure which is a layer stacking. The distance between the bilayers and the thickness of conductor layer should be a nano-sized to introduce a quantum heterostructure which may be grown by molecular beam epitaxy and metal-organic chemical vapor deposition. Both techniques can control a layer thickness close to one atomic layer.

The dipolar system created by applied field is transformed into anti-ferroelectrics in the bilayers and the supplied electric energy to the dipolar system is stored in the anti-ferroelectric nanostructure by creating it in the bilayer.

The present sample is made of an activated carbon powder. The activated carbon powder is mixed and coated with liquid ions. The carbon powder mixture is pressed to obtain the bilayers which are transformed from the carbon pores.

Dipolar Pseudo-Spin Wave in the Multilayer

When an external field is applied, an ion polarization and an excitation of valence electrons to conduction band create an collective dipoles in the multilayer system.

The ionic dipole and exciton density should be appropriately low because a high density causes to destroy the dipoles. An electronic dipole annihilation occurs at high exciton density where two excitons are spatially too close.

The experimental result about exciton density is reported by G. N. Ostojic et. el. [3] The 1D saturation density of excitons is $$n \sim 5 \times 10^8 \, m^{-1}$$

According to this figure, the 1D density of ionic dipoles shall be less than $5 \times 10^8 \, m^{-1}$, and the 2D density of ionic dipoles is about $2.5 \times 10^{17} \, m^{-2}$ Assuming that an exciton size is about nanometer scale $\sim 10^{-9}$ m, the separation distance is about 10 times larger than the exciton size.

In this case the dipole-dipole interaction in the vertical direction is quasi one dimensional.

The interaction energy between an excitonic dipole and an ionic dipole depends upon the directions and positions of the dipoles.

$$V_{ij} = \frac{1}{4\pi\varepsilon_0 r_{ij}^3} \left\{ \vec{d}_i \cdot \vec{D}_j - 3\frac{(\vec{d}_i \cdot \vec{r}_{ij})(\vec{D}_j \cdot \vec{r}_{ij})}{r_{ij}^2} \right\}$$

where $\vec{d}_i$ is a representation of an excitonic dipole in the conductor layer and $\vec{D}_j$ is that of an ionic dipole.

In this multilayer structure, $\vec{d}_i$, $\vec{D}_j$, and $\vec{r}_{ij}$ are parallel one another when DC field is applied. So, the sum of interaction energies in the direction vertical to the layer is $$V_{dD} = -\sum_{ij} \frac{|\vec{d}_i||\vec{D}_j|}{2\pi\varepsilon_0 r_{ij}^3}$$

which is an attractive interaction.

In the nanometer scale, a charge polarization in quantum heterostructure shall be a quantum dipole which is described in Quantum Mechanics.

The states of electronic and ionic dipoles shall be described in the eigenstates of two-level system in Q.M. language, which represents a transition.

$$\vec{d}_i = \hat{d}_i \hat{\sigma}_i^+ + \hat{d}_i^* \hat{\sigma}_i^-$$

$$\vec{D}_j = \hat{D}_j \hat{\sigma}_j^+ + \hat{D}_j^* \hat{\sigma}_j^-$$

where $$\hat{\sigma}^+ = \frac{1}{2}(\hat{\sigma}_x + i\hat{\sigma}_y)$$

$$\hat{\sigma}^- = \frac{1}{2}(\hat{\sigma}_x - i\hat{\sigma}_y)$$

where $\hat{\sigma}_x, \hat{\sigma}_y$ are the Pauli spin matrices, and $$\hat{d}_i = e\langle d|r|g\rangle, \hat{D}_j = e\langle D|r|g\rangle$$

$$\hat{d}_i^* = e\langle g|r|d\rangle, \hat{D}_j^* = e\langle g|r|D\rangle$$

where $$|d\rangle = \begin{pmatrix} 1 \\ 0 \end{pmatrix}$$

is an eigenstate of a dipole, and $$|g\rangle = \begin{pmatrix} 0 \\ 1 \end{pmatrix}$$

is a ground state,
and $$\hat{\sigma}^+ = \begin{pmatrix} 0 & 1 \\ 0 & 0 \end{pmatrix}$$

is a creation operator of a dipole and $$\hat{\sigma}^- = \begin{pmatrix} 0 & 0 \\ 1 & 0 \end{pmatrix}.$$

is a destruction operator of a dipole.

$$V_{dD} = -\sum_{ij} \frac{1}{2\pi\varepsilon_0 r_{ij}^3} (\hat{d}_i \hat{\sigma}_j^+ + \hat{d}_i^* \hat{\sigma}_i^-)(\hat{D}_j \hat{\sigma}_j^+ + \hat{D}_j^* \hat{\sigma}_j^-)$$

$$= -\sum_{ij} \frac{1}{2\pi\varepsilon_0 r_{ij}^3} \begin{pmatrix} \hat{d}_i \hat{D}_j \hat{\sigma}_i^+ \hat{\sigma}_j^+ + \hat{d}_i^* \hat{D}_j^* \hat{\sigma}_i^- \hat{\sigma}_j^- + \\ \hat{d}_i \hat{D}_j^* \hat{\sigma}_i^+ \hat{\sigma}_j^- + \hat{d}_i^* \hat{D}_j \hat{\sigma}_i^- \hat{\sigma}_j^+ \end{pmatrix}$$

P. W. Anderson [2] finds the meaningful terms in this expansion, which is expressed as a dipole-dipole interaction.

He has employed a dipole-dipole interaction terms in the system of excitons. The most important terms which have the effect of exciting one atom and de-exciting the other, that are due to the interaction of the electrons with those on neighboring atoms, are multipolar terms according to Anderson.

$$V_{atom} = \int dr dr' \psi^\dagger(r)\psi^\dagger(r') \frac{e^2}{|\vec{r} - \vec{r}'|} \psi(r')\psi(r)$$

$$\cong \frac{1}{4} \sum_{ij} X_i T_{ij} X_j (\hat{\sigma}_i^+ \hat{\sigma}_j^- + \hat{\sigma}_i^- \hat{\sigma}_j^+)$$

where
$\psi^\dagger(r) = \Sigma_i c_i^\dagger a_i^*(r-R_i)$ and $X_i = e \int a_i^*(r)(r-R_i)a_i(r)dr$ and $$T_{ij} = \frac{1}{R_{ij}^3}\left\{1 - 3\frac{R_{ij}R_{ij}}{R_{ij}^2}\right\}$$

which have the multipolar expansion terms of $$\frac{e^2}{|\vec{r} - \vec{r}'|}.$$

In view of Anderson, the same result can be derived from the dipole-dipole interaction of the excitonic dipoles and the ionic dipoles.

In view of Anderson, the important dipolar terms which have a physical meaning are $$V_{dD} = -\sum_{ij} \frac{\hat{d}_i \hat{D}_j^*}{2\pi\varepsilon_0 r_{ij}^3} (\hat{\sigma}_i^+ \hat{\sigma}_j^- + \hat{\sigma}_i^- \hat{\sigma}_j^+)$$

where the operators $\hat{\sigma}_i^+ \hat{\sigma}_j^-$ and $\hat{\sigma}_i^- \hat{\sigma}_i^+$ describe a creation of a dipole on a layer together with a destruction of a dipole on neighboring layer.

While the operator at $\hat{\sigma}_i^+ \hat{\sigma}_j^+$ describes a creation of two dipoles at the same time and $\hat{\sigma}_i^- \hat{\sigma}_j^-$ does a destruction of two dipoles at the same time. Both processes violate the conservation of energy and dipole number. Those terms of the operators shall be neglected.

The interaction terms of excitonic dipole and ionic dipole describe a propagation of pseudo spin waves across the layers in the direction vertical to the layer sheet.

If an external field is applied, the pseudo spin waves propagate crossing the layers as the above equation indicates. As the pseudo spin waves propagate in the vertical direction, the dipoles spread all over the multilayer structure as the power continues to be provided by an external field.

Novel Mechanism in Charge

A revolutionary novel mechanism employing a dipolar interaction for storing electric energy is completely different from a conventional method. Instead of utilizing a Faradaic mechanism or electrostatic mechanism, this novel device employs a dipole-dipole interaction between the electronic dipoles and ionic dipoles.

When DC voltage is applied perpendicular to the layer surface, the electrostatic potential between the positive electrode and the negative electrode can be expressed in the form of multipolar expansion in the polarizing insulator materials of the multi-layered structure.

The polarization of charges is in the range of nanometer scale, so it can be described as a quantum dipole.

An electrostatic potential can be expressed in a multipolar expansion. There are terms which may describe excitation of a valence electron to conduction band in the conductor layer.

In the nanometer scale, a charge polarization in quantum heterostructure shall be a quantum dipole which is described in Quantum Mechanics.

The states of electronic and ionic dipoles shall be described in the eigenstate of two-level system in Q.M. language, which represents a transition.

In this multilayer structure, the excitonic dipole, ionic dipole, and $\vec{r}_{ij}$ are parallel one another in the case that DC field is applied in the vertical direction to the layers. So, the sum of interaction energies in the direction vertical to the layer is simplified, which is an attractive interaction in charging process.

The important interaction terms which have a physical meaning are in view of Anderson, $$V_{dD} = -\sum_{ij} \frac{|\vec{d}_i||\vec{D}_j|}{2\pi\varepsilon_0 r_{ij}^3} = -\sum_{ij} \frac{\hat{d}_i \hat{D}_j^*}{2\pi\varepsilon_0 r_{ij}^3} (\hat{\sigma}_i^+ \hat{\sigma}_j^- + \hat{\sigma}_i^- \hat{\sigma}_j^+)$$

where the operators $\hat{\sigma}_i^+ \hat{\sigma}_j^-$ and $\hat{\sigma}_i^- \hat{\sigma}_j^+$ describe a creation of a dipole on a layer together with a destruction of a dipole on the neighboring layer.

The above interaction terms of excitonic dipoles and ionic dipoles describe a propagation of pseudo spin waves across the layers in the direction vertical to the layer sheet.

If an external DC field is applied in the direction vertical to the layers, the pseudo spin waves propagate crossing the layers as the above equation indicates. As the pseudo spin waves propagate in the vertical direction, the dipoles spread all over the multilayer structure as the power continues to be provided by an external field.

The electrical charge built-up at the nodes of the wave is due to a dipole-dipole interaction of electronic and ionic dipoles.

In microscopic view, the polarization of ions is a dipole for a pair of a positive ion and a negative ion like a molecule. The ionic dipole can be described as quantum dipole, which has an excited state and ground state.

A charge separation between the electrons and the holes is accompanied by the neighboring ions in the conductor layer. An electron excited from a valence band to a conduction band at the surface of the layer moves to the other side of the surface of the layer and leaves a hole behind.

The bound state of an electron and a hole is an indirect exciton which has a dipole moment in the conductor layer.

The process of creating excitons in the conductor layer is due to a dipole-dipole interaction between an indirect excitonic dipoles and ionic dipoles. This process continues to be progressing by an applied external power.

Those dipoles themselves are unstable if an applied external field is terminated. Unlike a capacitor, a charge double layer is not formed at the interface between electrode and electrolyte.

The life time of the excitons and ionic dipoles is so short that the dipoles can be destroyed as soon as an applied field is terminated.

In order to keep the stored energy stable inside the multilayer structure, some binding forces are necessary to keep the dipolar polarization stable.

In this case, a polaronic interaction is an appropriate dynamical mechanism.

A polaron is defined as a composite particle of electron plus ionic lattice deformation. The polaron interaction can hold an electronic charge close to the polarized ions.

In the bilayer both the electron and hole in the exciton can be pulled away by the polaronic forces in the opposite direction. The polaron interaction prevents the exciton from being destroyed by itself.

When the polaronic interaction is activated, an electron (a hole) of the excitonic dipole is pulled by the longitudinal mode of ionic dipole vibration, and the electron and the hole in the excitonic dipole are pulled away from each other and separated more by the force. In turn, the dissipating energy of the electrons (the holes) creates more the longitudinal motion of the ionic dipole vibration. This process keeps progressing until the excitonic binding is diminished, and the polaronic binding dominates in the bilayer.

When the polaronic function dominates the excitonic function, the positive polarons and negative polarons appear in the bilayer. The positive polaron can be combined by negative polaron to form an excitonic bipolaron by the Coulomb force of the electron and the hole. The collective phenomenon of those can be anti-ferroelectrics.

In macroscopic view, it is composed of the electronic charge double layers between the interval of two conductor layers comprising the bilayer, and the ionic charge double layer at the interval, which is in contrast with the case of super-capacitor. A charge double layer is formed at the interface between electrode and electrolyte in super-capacitor.

The electric energy supplied by both the positive and the negative electrodes is transferred and stored in the antiferroelectric nanostructure in the form of binding energy.

An electrostatic energy is stored in the dipole layers which are formed by an applied external field, and later in the anti-ferroelectric structure.

When a polaron interaction dominates to break an exciton into the electron and the hole, the electron placed at the surface of first conductor layer may see the hole sitting at the surface of the last conductor layer, and they may be bound through the Coulomb interaction to form an indirect excitonic dipole between the two conductor layers in the bilayer. This process is possible because the distance between the layers is also a nanometer size. The electron and the hole facing each other form an exciton between the first and second conductor layers in the bilayer, which is of the excitonic bipolaron.

DC electric power is applied in the direction perpendicular to the layer surface.

The polarized ions are two dimensional dipole sheet. It creates a strong dipolar field on the surface of the nearby conductor layer in the multilayer system.

The density of the ionic materials which are coated on the surface of the conductor layer may be low enough so that the polarization is to be a dipole.

The ionic materials coated on the surface of the conductor thin layers and sandwiched in the bilayer are polarized and lined up along with the external DC field.

The mechanism for a charging process is induced by a polaron interaction. If a polaron interaction is activated, the dipoles in the bilayers keep transforming into the antiferroelectric nanostructures in charging process.

The mechanism for a storing energy in the multilayer structure is a transformation process creating an antiferroelectric nanostructure in the bilayers.

The interaction between the dipoles of the same direction is a repulsive force in the horizontal direction. On the other hand, the interaction between the dipoles of the opposite direction is an attractive force.

The revolutionary way to enhance a battery capacity is to create a nanostructure comprised of the excitonic dipoles and the ionic dipoles combined together, which is a stable anti-ferroelectric nanostructure in the bilayer.

An electric energy is stored in the form of the antiferroelectric nanostructure in the bilayer.

The interaction between the excitonic dipoles and the ionic dipoles creates a collective phenomenon to form an antiferroelectric nanostructure in the bilayer. This phenomenon keeps the dipole system stable in the bilayer.

The cohesive energy in the case atom is defined as the difference in energy between the collection of free atoms and the collection of these atoms to make a metal. Likewise the energy transferred to the system to create an antiferroelectric nanostructure is stored as a binding energy.

Novel Mechanism in Discharge

When the battery cell is charged, the electronic charges and the ionic charges are bound together in the dipole system to form an anti-ferroelectric nanostructure in the bilayer, which is electrically neutral.

There are no apparent charges on the electrodes because a dipole system is bound state of positive and negative charge. A voltaic power is not produced by itself.

A guiding AC field is applied to the cell as a trigger power for discharge. The dipoles in the cell respond to the external AC power.

All electronic dipoles and ionic dipoles which are not in the antiferroelectric bound state are forced to oscillate along with the applied AC field. So the polaron interaction is not able to be effective for AC field.

The electric dipoles which are stored inside a superstructure begin to get released in response to the applied external field from the antiferroelectric structure and turns into the excitonic dipoles and the ionic dipoles, which is a reverse process to the storing energy. The dipoles released from the superstructure faced with antiparallel dipoles from the applied field. Their interaction is repulsive.

In the case that excitonic dipole $\vec{d}_i$ and ionic dipole $\vec{D}_j$ are antiparallel each another, the interaction in the direction vertical to the layer is $$V_{dD} = \sum_{ij} \frac{|\vec{d}_i||\vec{D}_j|}{2\pi\varepsilon_0 r_{ij}^3} = \sum_{ij} \frac{\hat{d}_i \hat{D}_j^*}{2\pi\varepsilon_0 r_{ij}^3}(\hat{\sigma}_i^+ \hat{\sigma}_j^- + \hat{\sigma}_i^- \hat{\sigma}_j^+)$$

which is a repulsive interaction.

The propagation of antiparallel pseudo spin waves into the electrodes is a mechanism for discharge.

The interaction between antiparallel dipoles of $\vec{d}_i$ and $\vec{D}_j$ does not come to be a polaron interaction in this case.

The battery cell is comprised of the electrodes and the multilayer structure. As the antiparallel pseudo spin waves propagate in the multilayer structure to the electrodes, the cell responds and acts like a capacitor to an external guiding AC field because the polaron interaction is not in action.

Because the interaction is repulsive, the dipoles stored in the antiferroelectric structure get released and traveled to the electrodes along with the guiding AC field. At the electrodes, the charges get released from the dipole bound states because the dipole-dipole interaction is repulsive.

The battery cell responds to an external AC field like a capacitor.

A each antiferroelectric structure of the battery cell acts like micro-voltaic power source. Macroscopic electric power may be enhanced by the micro-voltaic power.

In this case, the dispersion equation of AC field may be a complex.

The propagation of antiparallel pseudo spin waves into the electrodes is a mechanism for discharge. As the antiparallel pseudo spin waves propagate in the multilayer structure, the cell responds and acts like a capacitor to AC guiding external field because the polaron interaction is not in action.

Polaron Interaction

A polaron is defined as a composite particle of electron plus ionic polarization.

The acoustic vibration of dipoles is a dipolar phonon which is arisen by the dipolar interaction among ionic dipoles in the multilayer.

An optical vibration is due to the interaction between positive and negative charges.

The dissipating energy of an excited electron transfers to the optical phonon by scattering interaction, then a polaron interaction becomes effective in the bilayer. The electron pulls nearby positive ion toward it and pushes nearby negative ion away.

The dipolar phonon is closely related to the optical phonon in the linear chain of dipoles, which is quasi one dimensional in the vertical direction to the layers. The electron in the conductor layer is pulled toward the positive ion and the hole toward the negative ion through the interaction of acoustic dipolar phonon.

A conductor layer is adopted because the lower excitation energy of a valence electron is required for jumping to conduction band.

The length of the layer period in the multilayer structure should be in the range of nanometer scale for an electronic energy storage device, because the spatial period of the layers in the vertical direction is directly related to a polaron formation in the bilayer, and the thickness of layers as well.

The threshold energy of an electron moving with the momentum P dissipating its energy to create a phonon or a dipolar phonon according to C. Kittel [1] is $E_{min} = \frac{1}{2} m_e c_s^2 \approx 10^{-16}$ erg where $m_e$ is an electron mass and $c_s$ is the longitudinal group velocity of sound.

$$E_{min} = \frac{P^2}{2m_e}$$

And $P = \sqrt{2m_e}\sqrt{E_{min}} \approx \sqrt{2 \times 10^{-26} g}\sqrt{10^{-16} erg} \approx 10^{-21}$ In the multilayer structure, the electron momentum is related to the periodicity of layer structure in the vertical direction.

According the Bloch's Theorem, the electronic wave function is written with periodic potential by the layers as $\psi_k^n(x) = e^{ikx} u_{nk}(x)$ where k is a crystal momentum with a periodic layer.

The momentum P of an electron is related to a crystal momentum k when an external field is applied.

$P = \hbar k$

It can be written as $$e^{ikx} = e^{i\frac{P}{\hbar}x}$$

and $$kx = \frac{P}{\hbar}x = 2\pi$$

From the above equation, x can be calculated.

$$\frac{10^{-21}}{10^{-27} \text{erg} \cdot \text{sec}} x \cong 2\pi$$

therefore $$x \approx 10^{-6} \text{ cm}$$

The length of layer period x in the vertical direction is approximately order of ~$10^{-8}$ m, which is around in the range of nanometer scale.

The layer thickness and interval of multilayer structure should be in the range of nanometer scale in order to have a polaron interaction effective.

If the thickness and interval of the layers are larger than nanometer scale, there is no polaron interaction effective and the device functions just like a simple capacitor.

When an electron has energy above the threshold, a polaronic interaction is effective only with the vertical component of an optical vibration of ionic polarization.

The charge density that is due to ionic vibration at the conductor layer is $$\rho(x) = -\vec{\nabla} \cdot \vec{D}$$

Only the longitudinal mode contributes to the charge density as the above equation indicates.

The dissipating energy of an electronic charge that is above the threshold energy in the conductor layer in turn creates the ionic dipolar phonons in the vertical direction, so they are bound together to form polarons.

The electrons sitting at the surface of one conductor layer and the holes sitting at the surface of the neighboring conductor layer interact as an polaronic exciton between the conductor layers in the bilayer.

The antiferroelectric nanostructure is induced by the excitonic bipolaron interaction and the Coulomb force between the electrons and the holes in the bilayer. In this case the structural transition from the dipole arrays to the antiferroelectric nanostructure occurs.

The antiferroelectric nano-structure becomes stable due to the dipole-dipole interactions which are in the direction horizontal to the layers. The antiferroelectric structure has two dimensional structure in the bilayer.

In the case of the dipole system in the multilayer structure, the interaction in the horizontal direction and the interaction in the vertical direction should be considered separately in 2+1 dimensional structure.

A Creation of an Antiferroelectric Nanostructure

The interaction of negative polarons and positive polarons turns into the interaction of the electrons and the holes in the bilayer. The spatial separation of the electron and hole is nano-sized to form an indirect exciton. An electron which is on the conductor and a hole which is on the neighboring conductor in the bilayer are to be formed and bounded in pair of them. The excitons are created by Coulomb interaction and a polaron mediated interaction in the bilayer.

The indirect excitons bounded between two conductor layers have a dipole moment. The dipoles of the excitons are lined up along the horizontal direction to the layer plane. The direction of the excitonic dipoles is opposite to that of ionic dipoles in the bilayer to form an anti-ferroelectric configuration.

The direction of all dipoles in the multilayer is perpendicular to the layers. A force between dipoles of the same direction is attractive, but between dipoles of opposite direction is repulsive in the quasi one dimensional vertical line to the layers. The dynamics of the excitonic dipoles and ionic dipoles creates an anti-ferroelectric nanostructure due to a dipolar interaction along the horizontal direction. The anti-ferroelectrics in the bilayer is a different phenomenon from an ordering of dielectric molecules. The electric energy delivered to the system is stored as a binding energy of the nanostructures. The dipole system in the multilayer is unstable by itself while the anti-ferroelectric structure is stable by itself, and the electric energy supplied by an external power can be stored in the anti-ferroelectric structure.

Binding Energy of the Antiferroelectric Nanostructure

The antiferroelectric nanostructure is regarded as a composite system composed of the electronic dipoles and the ionic dipoles.

An electron and a hole in the conductor layer are bound into a pair to form an excitonic dipole. The excitonic dipoles in the conductor layer and ionic dipoles are transformed into the antiferroelectrics in the bilayer, which is induced by polaron and Coulomb interaction.

The antiferroelectric nanostructure is stabilized by the exchange interaction between the adjacent dipoles. The excitonic dipolar bosons and ionic dipolar bosons are coupled each other due to dipole exchange interaction in the horizontal direction, and can be transformed into diagonalized form of the interacting Hamiltonian, so the interaction disappears between the excitonic bosons and the ionic bosons. It means that the nanostructure is stable.

The electric energy can be stored approximately more than 10 MWh/Kg in this sample, so the battery capacity increased drastically compared to a conventional battery.

The formation of nano-structure with the aim of storing electric energy and creating a novel nanostructure, can provide unique collective properties of antiferroelectrics.

Anti-ferroelectric nanostructure is of physical importance for energy storage devices. The anti ferroelectric structures possess antiparallel-oriented electric dipoles, as a result, no macroscopic polarization can arise.

(1) The collective mechanism of the dipole systems can be explained in analogy with anti-ferromagnetic systems.

(2) The dipolar wave propagates along the vertical direction inside the sample, so that the electric energy can be stored or released inside the sample in three dimensional volume, so it can enormously boost the capacity of the battery cell.

(3) A capacitor has a limitation of charging power due to surface charges because of repulsive force between like-charges. But the breakthrough of this novel type battery has achieved by the capability to store electric energy in the volume in nanometer scale not on the surface and a neutrality of the nanostructure which cuts down the repulsive electric force between the like-charges.

In summary, energy crisis and global warming problem demand a solution by developing a novel energy storage device which has an extremely large capacity.

The demand for novel battery is that its capacity is way beyond conventional battery.

The manufacturing cost for the battery should be much lower than conventional battery for mass production. The materials composing this novel battery should be abundant on earth.

The present invention is related to electrical energy storage systems which is rechargeable over numerous cycles to provide reliable power sources for a wide range of electrical devices.

It is an object of this invention to provide an energy storage device having extended energy storage capacity over those previously unknown and novel methods. The main principle is to create an antiferroelectric nanostructure in the bilayer. The electric energy delivered to the system is stored in the anti-ferroelectric nanostructure as a binding energy.

The battery sample was made of an activated carbon powder and liquid ions. It may be useful for semiconductor technologies to construct a multilayer sample. But it is possible for the case of using activated carbon to obtain same results.

Activated carbon powder and liquid ions are mixed together, so liquid ions get adsorbed into the micro pores of the activated carbon. The average diameter of the micro pores is a nano-size.

After the carbon mixtures are dried out, it is pressed until the pore diameter is squeezed as a form of bilayer to the size at which the indirect excitons are able to get created in the bilayer. The pressed carbon mixtures are 2+1 dimensional layer stack.

To prevent direct current, thin insulator plastic film is used to separate the positive and the negative electrodes.

The positive and the negative electrodes are attached to the multilayer surface parallel to the layers to fabricate the cell.

The composite battery cell may be manufactured as follows.

A storage system at least one dissociable salt is selected from the ionic material group consisting of MgSO4, LiPF6, LiClO4, LiN(CF3SO2)2, LiBF4, LiCF3SO3, LiSbF6, Li4Ti5O12, etc. any kind of ionic mineral materials and dipole materials.

The material is selected from the group of open structured activated carbon powder, carbon nano tube, graphene.

For this sample, the material is selected from the group consisting of high surface area activated carbon powder.

The liquid ions are absorbed into the pores of the activated carbons and coated on the surfaces of the pores and on the whole surface of carbons.

MgSO4 was selected as an ionic material and mixed with oils to produce liquid ions.

The present invention relates to fabrication methods for activated carbon based rechargeable electric energy storage. More particularly, the present invention relates to a novel method to develop a battery of a huge capacity.

FIG. 13 shows how to obtain a multilayer structure according to an embodiment of the invention. The weight of the sample is about 0.01 g, and the diameter is about 2 mm, and the thickness is about 1 mm.

FIG. 14 is a schematic diagram showing a dipole-dipole interaction between excitonic and ionic dipoles according to an embodiment of the invention. The interaction takes place between the two parallel dipoles.

FIG. 15 is a schematic diagram showing a dipole field propagation to empty states according to an embodiment of the invention. The dipole field propagates to neighboring empty states as indicated by the arrows.

FIG. 16 is a schematic diagram showing a transformation to excitonic bipolaron according to an embodiment of the invention. The ionic dipole and the excitonic dipole in the left side of the figure is transformed to an excitonic dipolaron in the right side of the figure.

FIG. 17 is a schematic diagram showing an antiferroelectric transition according to an embodiment of the invention. The ionic dipoles and the excitonic dipoles in the left side of the figure make transition to the antiferroelectric bilayer structure in the right side of the figure.

FIG. 18 is a schematic diagram showing a linear chain of dipoles according to an embodiment of the invention. The quasi one dimensional chain is formed by the ionic dipole, the excitonic dipole, and the dipolar phonon in the multilayer as illustrated.

FIG. 19 is another schematic diagram showing a bilayer structure according to an embodiment of the invention.

The first conductor layer 10, the second conductor layer 20, and the last conductor layer are among the millions of layers of the multilayer structure. Especially, the first and second conductor layers 10, 20 may stand for two neighboring conductor layer in any specific positions. However, when used along with the last conductor layer for the positive or negative electrode, the first conductor layer 10 may be the very first conductor layer on the utmost top of the multilayer structure.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

1. C. Kittel "Quantum Theory of Solids" John Wiley & Sons, Inc. P137 (1963)
2. P. W. Anderson "Concepts in Solids" Addison-Wesley Publishing Co, Inc. P137 (1963)
3. G. N. Ostojic et el. "Stability of High-Density One-dimensional Excitons" Physical Review Letters 94, 097401 (2005)

What is claimed is:

1. An electric energy storage device comprising:
   a first conductor layer in a multilayer structure both surfaces of which comprising a first ionic or dipole material layer adjacent to an entire conductor surface thereof and being insulated electrically;
   a second conductor layer in the multilayer structure, both surfaces of which comprising a second ionic or dipole material layer adjacent to an entire conductor surface thereof and being insulated electrically, wherein a bilayer hetero-structure is comprised of the first and second conductor layers and the ionic material layer sandwiched therebetween,
   wherein the multilayer structure is comprised of the millions of conductor layers of nanometer thickness, both conductor surfaces of which being coated with the ionic or dipole materials across the enter surface thereof and being insulated electrically,
   wherein the first and second conductor layers form the bilayers configured to store an electrical energy in the bilayer in a form of binding energy,
   wherein the multilayer is consisted of the millions of the bilayers,
   wherein the ionic or dipole material layers comprise an ionic or dipole material selected from the group consisting of MgSO4, LiPF6, LiCl04, LiN(CF3S02)2, LiBF4, LiCF3S03, LiSbF6, Li4Ti5012, ionic polymers, ionic mineral materials, and dipole materials, wherein the ionic or dipole material is MgSO4, wherein a thickness of the conductor layers and the interval between the conductor layers are a nanometer scale to form a quantum dipole system of excitons and ions, so that an interaction between excitonic dipoles and ionic dipoles occur in the bilayer hetero-structure;

a positive electrode attached to the first conductor layer of the multilayer structure; and a negative electrode attached to the last conductor layer of the multilayer structure, wherein every conductor layer in the multilayer structure is disconnected, insulated and isolated from an electric current, and each conductor layer is not a current collector, but an excitonic dipole collector, wherein neither electronic nor ionic current is allowed in the multilayer structure except for the electrodes which are attached to a copper (conductor) sheet, because the current in the multilayer structure destroys the excitonic dipoles and the ionic dipoles, wherein the first conductor layer is stacked on top of the second conductor layer with a nanometer-scale interval and the ionic or dipole material layer is sandwiched therebetween so as to form the bilayer structure, wherein the electrical energy is stored in the bilayer by applying a DC voltage in a direction perpendicular to a layer plane sheet to the positive and negative electrodes, wherein the stored an electrical energy is discharged and output to the electrodes by using an external AC field in a predetermined frequency range as a guiding wave with trigger power, wherein the conductor layer is adopted because low excitation energy of valence electrons is required for jumping to a conduction band, and the nanometer thickness of the conductor layer is adopted because a reciprocal of a length of a layer period in the vertical direction shall be large for a polaron formation at an interface between the conductor layer and the ionic layer, wherein the length of the layer period in the multilayer structure is in a range of the nanometer scale to have a quantum dipole interaction in the bilayers, wherein the length of the layer period in the multilayer structure is in the range of nanometer scale for an electrical energy storage device, so that a spatial period of the conductor layers in the vertical direction is directly related to the polaron formation in the bilayers, and the thickness of conductor layers as well, wherein a linear chain of excitonic dipoles and ionic dipoles is introduced and formed in the vertical direction to the conductor layers, and an optical vibration is governed to be tuned by the acoustical vibration and the frequencies of the vibrations as well, wherein the layer thickness and interval between the conductor layers are in the range of the nanometer scale for formation of the quantum dipole system and exciton, wherein the layer thickness and interval in the multilayer structure are in the range of the nanometer scale in order to have a polaron interaction effective, and the polaron formation at the interface between the conductor layer and the ionic layer is important in a storing an electrical energy in the bilayers, because an excitonic and ionic dipole structure has been transformed into an excitonic bipolaron which leads to the formation of a stable anti-ferroelectric structure in the bilayers, wherein when an external field is applied, a polarization of ions and an excitation of the valence electrons to conduction band create a collective dipole in a multilayer system through a propagation of a dipole field (pseudo spin wave) from the electrodes to the empty states, wherein an interaction energy between an excitonic dipole and an ionic dipole depends upon the directions and positions of the excitonic dipoles and ionic dipoles in the bilayer, which is a quasi-one dimensional interaction in the vertical direction to the conductor layers, wherein in the nanometer scale, a charge polarization in a quantum hetero-structure is a quantum dipole, wherein the states of electronic and ionic dipoles are described in the eigenstates of two-level system, which represents a transition, wherein the interaction terms of excitonic dipoles and ionic dipoles describe a propagation of pseudo spin waves across the layers in the vertical direction to the layer plane sheet, wherein the pseudo spin waves propagate crossing the conductor layers by an applied power, and as the pseudo spin waves propagate in the vertical direction, the excitonic dipoles and ionic dipoles spread all over the multilayer structure as the applied power continues to be provided by the external field, wherein a mechanism for a charging process is induced by the polaron interaction, and by the polaron interaction and Coulomb force, the excitonic dipoles and ionic dipoles keep transforming into the anti-ferroelectric nanostructures in charge, wherein the polaron interaction is so strong that the excitons in the conductor layer have been broken into the electrons and the holes to form the positive polarons and the negative polarons in the bilayers, wherein the positive polarons on one conductor layer and the negative polarons on the other conductor are combined together to form excitonic bipolarons in the bilayers, and wherein a mechanism for a storing energy in the multilayer structure is a transformation process from the quantum dipole system creating into an anti-ferroelectric nanostructure created by the applied power in the bilayers.

2. The electric energy storage device of claim 1, wherein each of the first and second conductor layers includes activated carbons, electrically polarizing ionic materials, graphenes, carbon nanotubes, or any kind of conducting materials that should be nanometer-scale in order to make the polaron interaction effective and suitable to get doped with an ionic material for the conductor layer, ionic polymers, and ionic minerals.

3. The electric energy storage device of claim 1, wherein each of the first and second conductor layers and the ionic or dipole material layers is two-dimensional with a nanometer-scale thickness.

4. The electric energy storage device of claim 1, wherein the first and second conductor layers are stacked on top of each other, between which the dipole or ionic material layer is sandwiched, so as to form a 2+1 dimensional multilayer, wherein each of the first and second conductor layers and the dipole or ionic material layer is 2 dimensional and forms the layer plane sheet which is not bent because of a dipole-dipole interaction depending on the directions of the excitonic dipoles and ionic dipoles, and a bending the sheet may change the interaction, and wherein the dipole-dipole interaction between excitonic dipoles and ionic dipoles is the quasi-one dimensional.

5. The electric energy storage device of claim 1, wherein the ionic or dipole materials coated on the first and second conductor layers has a substantially zero electric charge transport property so as to be an insulator and to make the ionic or dipole materials polarizing.

6. The electric energy storage device of claim 1, wherein a nanometer-sized bound state of charge which is the quantum dipole is induced and created by an applied external field, and the process of a quantum dipole formation in the multilayer is due to a dipole-dipole interaction of the electronic dipoles and ionic dipoles and a dipole propagation property as a pseudo spin wave inside the multilayer.

7. The electric energy storage device of claim 1, wherein the 2 ferroelectric dipole system is formed in the multilayer through a propagation of the dipolar pseudo spin wave by an applied external DC field wherein the dipole-dipole interaction is attractive in the quasi one dimensional vertical line to the layers.

8. The electric energy storage device of claim 1, wherein the quantum dipole system in the multilayer begins to be transformed to an excitonic bipolaron and an anti-ferroelectric structure by a polaron interaction and Coulomb forces in the bilayers, wherein a neutrality of the anti-ferroelectric nanostructure helps a charging process.

9. The electric energy storage device of claim 1, wherein the electrical energy is stored in the anti-ferroelectric nanostructure as a binding energy in the bilayers as a form of charge double layer.

10. The electric energy storage device of claim 1, wherein with respect to a density of the system, a high capacity means a high electric energy density and a high electronic charge density, wherein a nano-sized bound state of charges in the bilayer is introduced, and the millions of the bilayers are stacked one by one so that the multilayer structure is formed in a three dimensional volume, and the layer density of the multilayer structure is very high, so that the stored energy density in the multilayer is tremendously boosted.

11. The electric energy storage device of claim 10, wherein an external AC guiding field is applied to the electrical energy storage device for discharge, wherein the electrical energy is stored inside the electric energy storage device in the three dimensional volume, and wherein the anti-ferroelectric nanostructure functions as a micro-voltaic power source in discharge, wherein the output voltaic power is a sum of the micro-voltaic power.

12. The electric energy storage device of claim 1, wherein a mechanical process of releasing the stored energy from the anti-ferroelectric structure is related to a propagation of antiparallel pseudo spin waves to the electrodes along with the applied guiding field in the vertical direction in discharging process.

13. The electric energy storage device of claim 1, wherein the antiparallel dipoles of their repulsive interaction propagate in the form of pseudo spins wave into the electrodes by an external guiding field in discharging process.

14. The electric energy storage device of claim 1, wherein at the electrodes, the stored energy is released as a voltaic power by a guiding AC field because the interaction between the antiparallel dipoles in the quasi one dimensional line is repulsive.

15. The electric energy storage device of claim 1, wherein each of the first and second conductor layers is made from one selected from the group consisting of open structured activated carbon powder, carbon nano tube, and graphene.

16. The electric energy storage device of claim 15, wherein each of the first and second conductor layers is made from high surface area activated carbon powder of which pores scale is in a nanometer range.

17. The electric energy storage device of claim 1, wherein the first and second conductor layers are formed by pressing activated carbon mixtures with liquid ionic materials until the pore diameter is squeezed as a form of bilayers to the nanometer size in the multilayer structure.

18. The electric energy storage device of claim 17, wherein the multilayer structure has a shape of a disc having about 0.2 g weight, about 3 mm diameter, and about 2 mm thickness.

19. An electric energy storage system of claim 18, wherein the direction of the electric current in the electrodes and dipoles in the multilayer is forward and backward in turns according to the external AC field.

* * * * *